United States Patent [19]

Canick et al.

[11] 3,931,929
[45] Jan. 13, 1976

[54] TAPE PERFORATOR

[76] Inventors: Leon N. Canick, 6700 192 St., Fresh Meadows, N.Y. 11365; Charles S. Aldrich, R.F.D. 1, Stillwater Road, St. James, N.Y. 111780

[22] Filed: Mar. 10, 1975

[21] Appl. No.: 557,230

[52] U.S. Cl............................... 234/110; 234/119
[51] Int. Cl.² ........................................ G06K 1/02
[58] Field of Search.................... 234/110, 119, 128

[56] References Cited
UNITED STATES PATENTS

| | | |
|---|---|---|
| 3,001,694 | 9/1961 | Simmerman et al............... 234/110 |
| 3,556,396 | 1/1971 | Terbrueggen et al.............. 234/110 |
| 3,870,224 | 3/1975 | Canick et al...................... 234/110 |

*Primary Examiner*—J. M. Meister
*Attorney, Agent, or Firm*—Leonard H. King

[57] ABSTRACT

The present disclosure is particularly directed to means that will slow down the operation of the tape perforating apparatus during the time intervals when the fulcrum levers must either travel into place or withdraw themselves from underneath of the lift levers in order to create more time for the critical transfer to take place. The present invention utilizes a double-ended bellcrank instead of the crank link disclosed in the aforementioned patent. As the main drive shaft rotates, the upper end of the bellcrank travels through an elliptical path that creates a partial dwell in the travel of the cradle when the front end of the cradle is near its low position. A partial dwell therefore occurs at the rear end of the lift levers at the critical transfer position.

7 Claims, 19 Drawing Figures

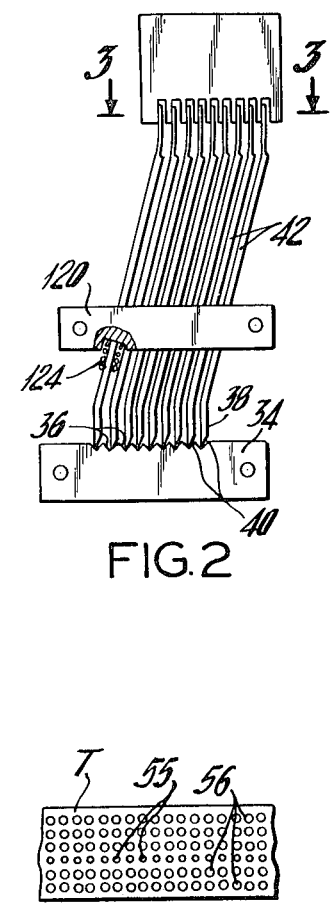
FIG. 2
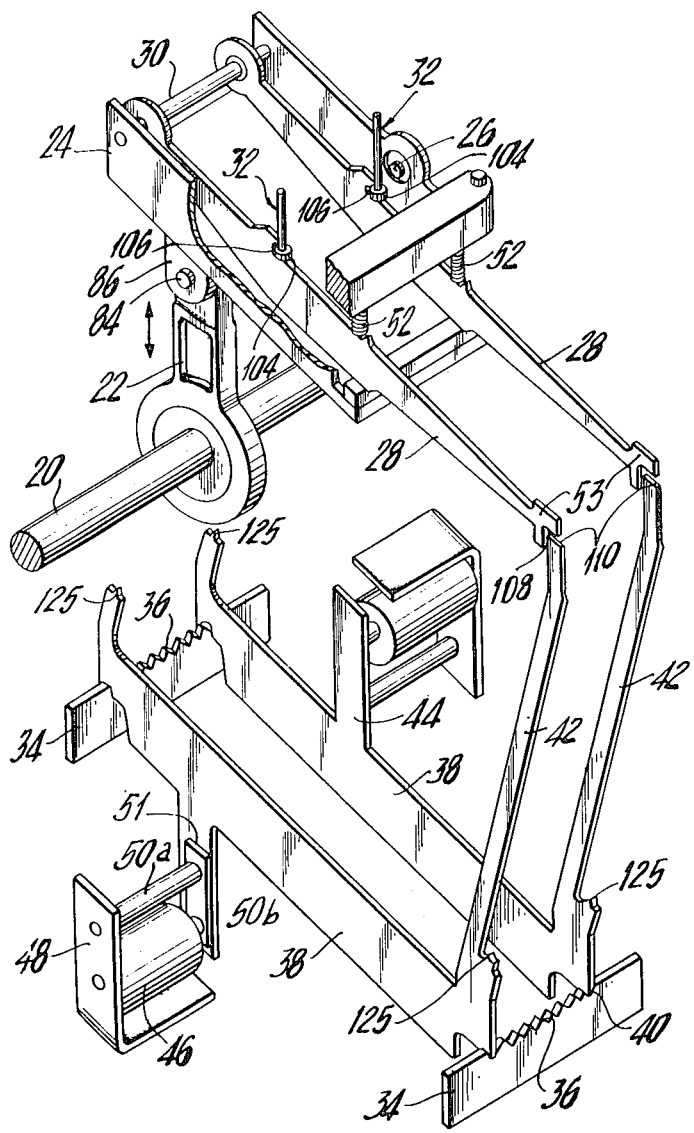
FIG. 1A
FIG. 1
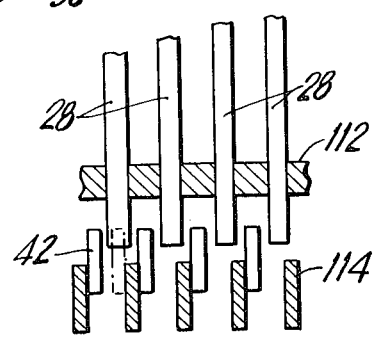
FIG. 3

TAPE PERFORATOR

This invention relates generally to tape perforators and more particularly to an improved mechanism for actuating the punches thereof.

SUMMARY OF THE INVENTION

The present invention provides improved means for perforating a length of tape formed of paper, plastic, thin metal foil or combinations thereof that are, for example, between 0.0025 inches and 0.0045 inches thick. The present invention can punch at speeds in the order of 75–125 characters per second on standard 5, 6, 7 or 8 track tapes. A plurality of punches are individually mounted intermediate the ends of separate lift levers, each of which levers is pivotally mounted, at one end thereof, on a common pin that is secured to a cradle. An eccentric drive link, which is driven by a motor, is coupled to the cradle which is also pivotally mounted by trunnions on a fixed support.

Normally the eccentric mounting of the drive link causes the ends of the cradle and the lift levers to oscillate and move up and down together through a predetermined length of stroke. However, the punches will not perforate the paper since they are located approximately on the pivot axis of the cradle. When it is desired to utilize one of the punches, one of a second group of fulcrum levers is brought into an interfering relationship with the free end of the selected lift lever. Continued motion of the eccentric drive link will cause the selected lift lever and its associated punch to move independently of the cradle and, in cooperation with a suitable die, to perforate the tape since the lift lever that supports the punch is prevented from moving downwardly with the supporting cradle. The fulcrum levers are balanced on a pair of knife edges and are pivoted to a position that interferes with the first lever by means of the energization of a coil. Springs provide the means for returning the fulcrum levers to their original positions. Conventional circuit means are used to actuate the coils in response to input signals that correspond to the desired sequence and pattern of perforations.

In addition to the eccentric drive system that supports the punch cradle, a second eccentrically mounted link system is supported on the same drive shaft and times the tape feed to cause advance of the tape only when the punches are below the tape slot. The tape is advanced by means of a toothed feed sprocket that is driven through a ratchet motion which is responsive to the second eccentric link system. A second solenoid actuated ratchet arrangement provides a backspacing function for the tape. The preferred form of the present invention provides simplfied means for slipping the length of tape under a tape guide and around the feed sprocket. The tape guide also includes a switch for detecting a tape break or the end of the tape and stops for different widths of tape as well as a single stop that is common to all widths of tape. Means are also provided for selectively slowing the operation of the tape perforating apparatus and for creating more time for the critical transfer of the fulcrum levers either into place or away from the lift levers.

Accordingly, it is an object of the present invention to provide an improved tape perforator.

Another object of the present invention is to provide a tape perforator, as described above, having improved means for selectively displacing one or more punches.

A different object of this invention is to provide tape feed timing means in combination with the tape punching means.

An additional object of this invention is to provide tape backspacing means in combination with the tape feed means.

A further object of this invention is to provide simplified means for inserting different widths of tape into the tape feeding means.

An important object of the present invention is to provide means for selectively slowing the operation of the device during the time interval when the fulcrum levers must either travel into place or withdraw themselves from underneath the lift levers.

These and other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing like reference characters designated like parts.

FIG. 1 is a schematic, perspective view, partially broken away and with portions omitted for clarity illustrating certain structural features of the present invention;

FIG. 1A is a fragmentary plan view of a typical length of perforated tape;

FIG. 2 is a schematic and elevational view, partially broken away and partially in section, illustrating the structure shown in FIG. 1;

FIG. 3 is a fragmentary plan view, partially in section and partially in phantom, taken along line 3—3 of FIG. 2;

DESCRIPTION OF THE PREFERRED EMBODIMENT

Figure 4A:
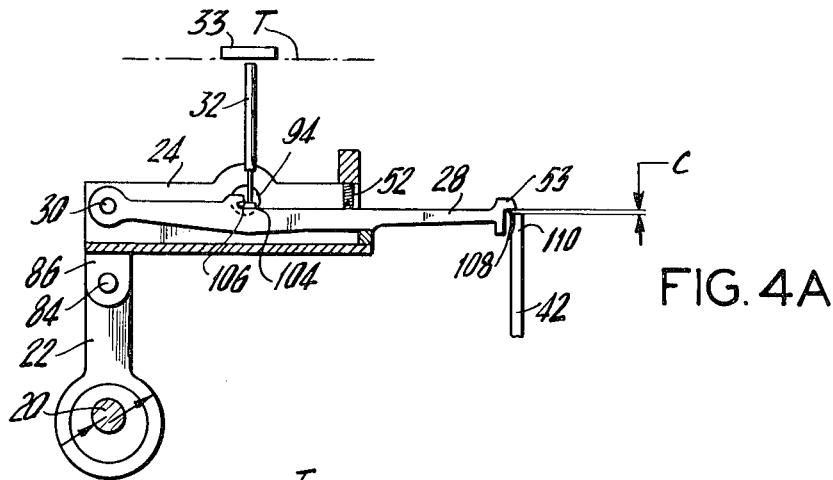
FIGS. 4A, 4B and 4C are schematic elevational views illustrating various positions of the structure shown in FIG. 1.

The mode of operation of the present invention can best be understood by first referring to the schematic drawings of FIGS. 1–4. A shaft 20 is driven by a motor and a drive system such as meshing gears or belts and pulleys (not shown) and a crank type line 22 is mounted eccentrically on the motor driven shaft 20. A cradle 24 is pivotally mounted on the link 22 and is also pivotally mounted at 26 on fixed structure to be further described hereinafter. A plurality of lift levers 28 are pivotally mounted on a common transverse pin 30 that is secured to side walls of the cradle 24. Each of the lift levers 28 supports a punch 32 such that the transverse plane defined by the plurality of punches 32 is approximately coincidental with the axis 26. As will be described later, a die plate 33 cooperates with the punches 32.

A pair of plates 34 that are rigidly secured to the housing of the perforator are each provided with a plurality of V-shaped notches 36 that are equal in number to the lift levers 28. A fulcrum lever 38 having knife edges 40 at opposite ends thereof is mounted in each of the V-shaped notches 36. A first extension 42 of each fulcrum lever 38 is positioned in close proximity with the free end of each lift lever 28 that is opposite to the pin 30. A second extension 44 which acts as an armature is provided along the length of each fulcrum lever 38 and is positioned in close proximity to a coil 46 that is mounted on a bracket 48 which is part of the magnetic path. Two magnetic poles 50a and 50b act as stops and in conjunction with the coil 46. The bracket 48 and the armature portion of the second extension 44 compose the electromagnetic circuit. A non-magnetic shim 51 provides a low permeability "air" gap in the magnetic circuit.

When the shaft 20 is rotated by the drive motor the eccentrically oriented link 22 will move up and down causing the cradle 24 to oscillate about the axis 26 together with the lift levers 28. When one of the coils 46 is energized, the second extension 44 of the respective fulcrum lever 38 will be brought into engagement with the armature of the coil 46 causing the selected fulcrum lever 38 to pivot about its knife edges 40 and thereby place the upper end of the first extensions 42 in direct opposition to the free end of the respective lift lever 28. This is shown in phantom outline in FIG. 3 wherein it will also be noted that the upper end of the first extensions 42 of the fulcrum levers 38 are normally laterally spaced from the lift levers 28 when the apparatus is not in the punching mode.

Figure 4B:
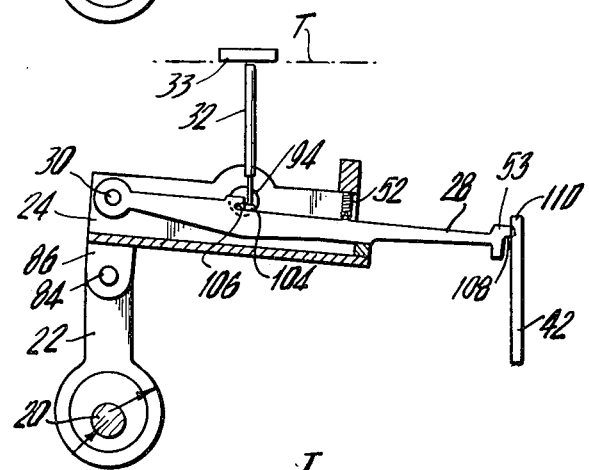
Figure 4C:
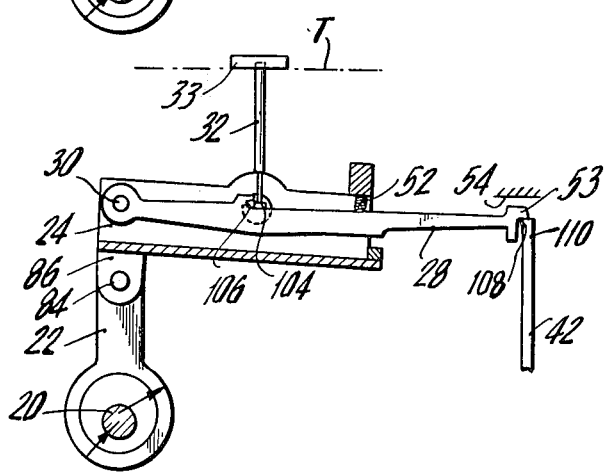

As shown in FIG. 4A, the neutral position of the punch 32 is below the lower plane of the tape T when the axis of the link 22 is at its lowest position with respect to the axis of the shaft 20. In the non-punching mode the shaft 20 cranks the link 22, which will oscillate both the cradle 24 and the lift levers 28 as a unit about the axis 26. In the non-punching mode, the free end of the lift levers 28 will bypass the laterally spaced upper end of the extensions 42 as shown in FIG. 4B when the axis of the link 22 is at its highest position with respect to the axis of the shaft 20. However, when the coil 46 is energized in the punching mode and the first extension 42 is displaced into an interfering position with the free end of the selected lift lever 28 (FIG. 4C), the continued oscillation of the cradle 24 will cause the pivoted end of the lift lever 28 to move upwardly and thereby cause the punch 22 to move above the plane of the tape T and engage the die plate which is schematically designated by the reference character 33. The free end of the lift levers 28 cannot move downwardly due to the interference described hereinabove. At this time a spring 52, positioned between the lift lever 28 and a portion of the cradle 24, will be compressed so that when the coil 46 is de-energized and the first extension 42 is moved away from the interfering position shown in FIG. 4C, the spring 52 will act downwardly on the lift lever 28 and will withdraw the punch 32 from the die plate 33 and the tape T. However, the withdrawal of the punches 32 is not solely dependent on the action of the springs 52. Should a punch 32 stick it will be positively retracted since each lever 28 is provided with an auxiliary pivot 53 in the form of an enlarged head end or projection. Thus, the end 53 of the lever 28 will bear against a fixed upper stop 54 and the punch 32 will be withdrawn as the pivoted end 30 thereof moves downwardly with the end 53 acting as the pivot axis of the affected lever 28.

A typical length of tape T is shown in FIG. 1A. A generally central line of openings 55 is punched into the tape T and is used for driving the tape T in a manner to be described hereinafter. The remaining openings 56 are formed by the punches 32. As shown in the drawing the holes 54 may be smaller than openings 56.

The construction of a preferred embodiment will now be discussed in connection with FIGS. 5 through 12. The shaft 20 is rotatably journalled in bearings 60 and 62 that are secured within end walls 64, and 66, respectively. Immediately inward of the end wall 64, a disc 68 is rigidly secured to the shaft 20 by means of a set screw 70. The disc 68 includes a magnet 72 on the periphery thereof and a coil 74 (FIG. 11) is secured to the end wall 64 so that reference signals for the tape punch and the tape advance signals may be provided. A variable reluctance magnetic pickup, light responsive means or other pulse generating means may be used in place of members 72 and 74.

As mentioned above the eccentric link 22 is also mounted on the shaft 20. As shown for example in FIGS. 5 and 7, the link 22 is molded of a light weight, plastic material and is supported on the shaft 20 by means of a bearing 76 in order to minimize friction. The bearing 76 is, in turn, mounted on a sleeve 78 that is secured to the shaft 20 by means of a set screw 89. The rotational axes of the link 22, the bearing 76 and the sleeve 78 are concentric with respect to each other but eccentric with respect to the longitudinal axis of the shaft 20.

The other end of the link 22 is provided with a bearing 82 that is supported on an eccentric pin 84 which is adjustably mounted within a clevis 86 formed integrally with the underside of the cradle 24. The pivot pin 30 is secured to a pair of laterally spaced apart side walls 88 that are formed integrally with an extend upwardly from the cradle 24. Spacers 90 are interposed between each of the lift levers 28 and are also mounted on the pivot pin 30, as shown for example in FIG. 7.

A U-shaped member 92 is mounted on the end wall 64 by means of suitable fasteners and support trunnions 94 that define the pivot axis 26 for the cradle 24. A block 96 is removably secured to the support 92 by means of screws 98. The punches 32 extend through accurately formed openings 100 in the block 96. The lower end of each of the punches 32 is provided with a reduced diameter portion 102 and an enlarged head 104 that is received in a notch 106 formed on the upper surface of each of the lift levers 28 proximate the midpoint thereof. It should be noted at this time that the head 104 of each punch is located approximately coincidental with the pivot axis 26.

As described previously, the end of each of the lift levers 28 opposite the pivot pin 30 is provided with an enlarged head end 53 that defines a shoulder 108. The upper end 110 of the first extension 42 of each fulcrum lever 38 is positioned in close proximity with the shoulder 108 but laterally spaced from the plane thereof. A slotted guide member 112 is arranged to receive the head end 53 of each of the lift levers 28 and a slotted guide member 114, which is secured to another end wall 116, is arranged to receive the upper end 110 of each of the first extensions 42. The first slotted guide member 112 is secured to the second slotted guide member 114 with the slots in each of these members being in alignment with each other. Normally, as shown in FIG. 4A there is a clearance C between shoulder 108 and end 110.

Another end wall 118 is provided in spaced, parallel opposition with the end wall 116. The plates 34, each having the V-shaped notches 36, are secured to the walls 116 and 118, as shown for example in FIG. 5 and FIG. 6. Directly shown above each of the plates 34 there is provided a transverse bar 120 that is secured to the walls 116 and 118 by means of screws 122 and which contains one end of the springs 124. The other end of the springs 124 are mounted on projections 125 formed integrally at both ends of each of the fulcrum levers 28 and is positioned betwen the confronting surfaces of each of the fulcrum levers 38 and the underside of the bar 120. There is a similarly mounted spring 124 positioned at both ends of each of the levers 38.

The tape feed mechanism will now be described in connection with FIGS. 5–12. A second, plastic link 126 is also mounted on the shaft 20 by means of a bearing member 128. A sleeve 130 supports the bearing 128 and is secured to the shaft 20 by means of a set screw 132. The rotational axes of the second link 126, the bearing 128 and the sleeve 130 are concentric with respect to each other but eccentric with respect to the longitudinal axis of the shaft 20. It should be noted at this time that the positions of the links 22 and 126, with respect to each other, are arranged so that the tape is fed in timed relationship with the movement of the cradle 24.

The link 126 is formed of a lightweight, plastic material and supports one end of a lever 134 by means of a low friction bearing 136 and a pin 138. A pin 140 is mounted in the other end of the lever 134. An L-shaped bracket 142 having a U-shaped upper end 144 is slideably mounted on the pin 140. The other leg of the L-shaped bracket 142 is positioned in close proximity to the poles 146 of a pair of coils 148 which are suitably mounted on the wall 66 and which are preferably wired so that the pole faces are of opposite polarity. The L-shaped bracket 142 at its opposite end is secured to a sleeve 150 which is mounted in bearings 152. A post 154, which also is secured to the end wall 66 supports the bearings 152. For purposes to be described hereinafter, the pin 140 also supports a first pawl 156. A torsion spring 158 is wound around the pin 140 as well as around a stud 160 that is secured to the lever 134.

A shaft 162 is journaled on bearing means 164 that are positioned within the end walls 64 and 66. The shaft 162 is generally parallel with and spaced above the shaft 20. A feed sprocket 166 having a plurality of radially oriented teeth 168 formed on the periphery thereof is secured to the shaft 162 by means of a set screw 170. A ratchet 172 is adjustably mounted on the shaft by means of a screw 173 that is mounted on the shaft 162. The head of the screw 173 is eccentric with respect to its shank and is arranged to provide slight angular displacement of the ratchet 172 with respect to the sprocket 166. The ratchet 172 is arranged to be angularly displaced in step-wise increments by means of a pawl 156. In order to assure that the ratchet 172 moves only a fixed angular increment, a detent, generally designated by the reference character 174 (FIGS. 7 and 12) is provided. The detent 174 is pivotally mounted on a shaft 176 that is secured to the wall 66 and is provided with an arm 178 from which a pin 180 extends. The pin 180 is arranged to engage the teeth of a second ratchet 184 that is also mounted on the shaft 162. A torsion spring 186 extends between the arm 178 and an eccentric stud 188 that is pivotable in the end wall 66 to serve also as an adjustable back stop for L-shaped bracket 142.

When the coils 148 are energized, one leg of the L-shaped bracket 142 will be drawn against the armatures thereof. The other end of the L-shaped bracket 142 will swing the lever 134 about the pin 138 and thereby engage the pawl 156 with the teeth of the ratchet 172. A stabilizing link 190 is pivotally connected to the second link system 126 by means of a pivot pin 192 and to the wall 66 by means of a pivot pin 194. A torsion spring 196 extends between the link 190 proximate the pivot pin 194 and one arm of the L-shaped bracket 142 and serves as a return spring for the armatures of the coils 148.

The tape T is very easily inserted by sliding the free end thereof beneath a first cover 198 that is secured to a top plate 200. The cover 198 is provided with an entrance end 202. A guide arm 204 is pivotally mounted on a pin 206 that is secured to the cover 198. The guide arm 204 includes a plurality of steps 208 that define guide surfaces for one longitudinal edge of different width tapes, for example 11/16, ⅞ or 1 inch wide. The other edge of the tape is guided by a block moveably fixed to the top cover 200. A switch 214 for detecting the end of or a break in the tape T is mounted directly below the arm 204. The switch 214 is secured to mounting plate 201 which in turn is secured to the extension 212.

After traversing the first cover 198 the tape T is then threaded beneath beveled inlet end 216 of die plate 33 that is positioned directly above the punches 32. A cover 218 is provided to contain and guide the punched out portion or chad, of the tape through an outlet channel 219 as shown by the arrow in FIG. 8. The tape T is then threaded over the teeth 168 of the sprocket 166 and exits the perforator comprising this invention at a bar 220 that has a curved outlet end 222.

A cover plate, generally designated by the reference character 224, is provided for the sprocket 166. The cover plate 224 is pivotally mounted on a pin 226 that is integral with one arm of a bell crank lever 228. The other end of the bell crank lever 228 is provided with a rod 230 that includes a transverse stop pin 232 and a compression spring 234. The rod 230 extends through a pin 236 that is journaled in the end wall 64 (FIG. 7) on a bearing 238. The bell crank lever 228 and the compression spring 234, in combination with the rod 230, provides an overcenter toggle arrangement for the cover 224. The cover 224 is raised in the threading operation and lowered as final tape loading sequence step.

Figure 12:
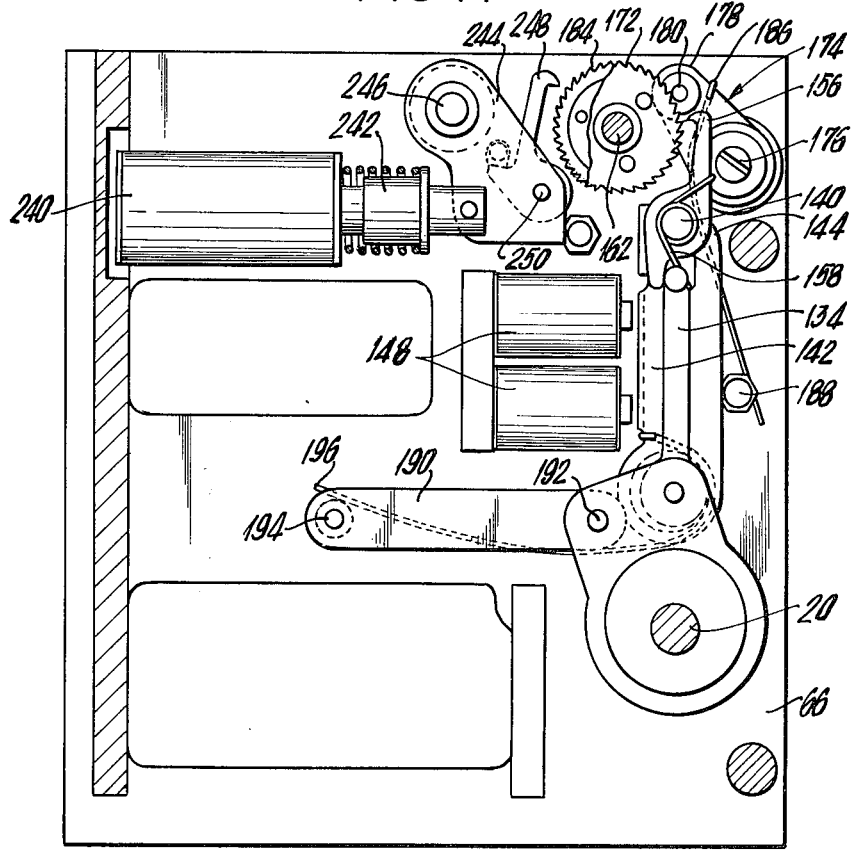
FIG. 12 is a sectional elevational view taken along line 12—12 of FIG. 7.

As shown, for example in FIG. 12, a backspacing arrangement is also provided with the present invention. The backspacing structure permits a "code delete" operation for punching all holes to erase a punching error and includes a coil 240 having a spring biased armature 242. The coil 240 is mounted on the end wall 66 and the armature 242 thereof supports a lever 244 that is pivoted on a pin 246. A pawl 248 is pivotally mounted on a pin 250 that is integral with the lever 244. It should be noted that the pawl 248 is positioned in the plane of the second ratchet 184 whose teeth are oriented in a direction that is opposite to the teeth of the first ratchet 172.

Figure 13:
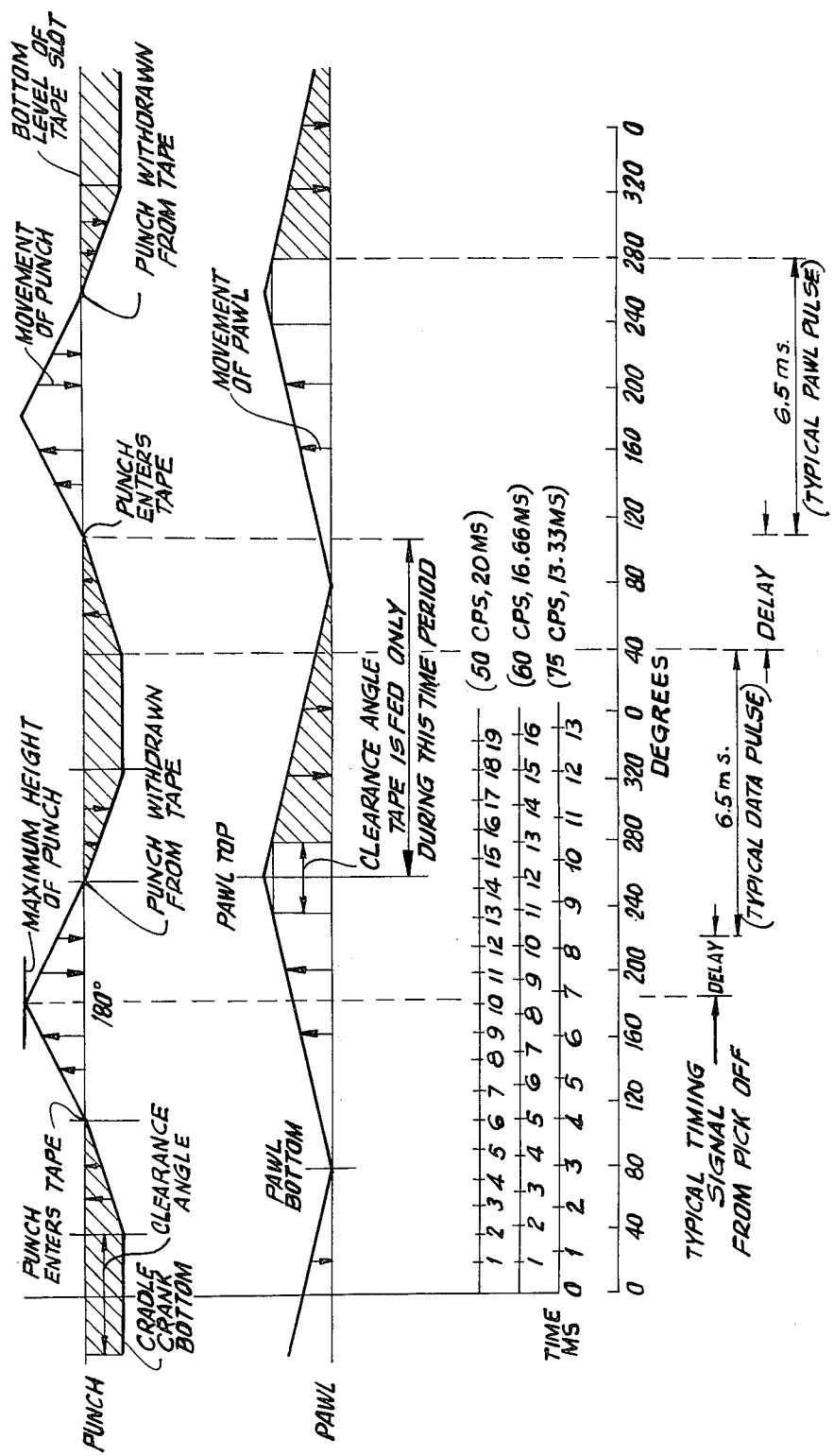
FIG. 13 is a timing diagram of the apparatus comprising the present invention.

As mentioned earlier, the circuitry for controlling the taper perforator comprising this invention is conventional and, as such, forms no part of the invention. Bearing this in mind, reference may now be had to FIG. 13 which schematically illustrates a timing chart. As shown, when 75 characters per second (cps) are perforated, one complete cycle will occur in approximately 13.33 ms. Similarly, 50 cps are perforated in approximately 20 ms while 60 cps are perforated in 16.66 ms.

The combination of the magnetic slug 72 on the shaft 20 and the variable reluctance magnetic pick-up 74 provides a reference signal with respect to the position of shaft 20 that the conventional circuitry for pulsing the solenoids 46 that control the actuation of the punches 32 and the solenoids 148 that control the actuation of the pawl 156. By way of example, when 75 cps are perforated the solenoids 46 and 148 each are energized for approximately 6.5 ms, there being approximately a 3.0 ms delay intermediate the energization of the solenoids 46 and 148.

The approximately 6.5 ms pulse to the solenoid 46 is timed to bring the fulcrum extension 42 under the end 53 of the lever 28 at or before the time that the clearance c between them is formed by the position of cradle 24. As the clearance c is taken up, the fulcrum arm 42 is maintained in place by retained magnetic force which does not end when the pulse ends and by the mechanical locking action produced by the slant of the fulcrum levers 42 and the force produced by the springs 52 acting through the lift levers 28. This double action significantly adds to the reliability of the unit. The tape cannot be advanced during the punching cycle because of the mechanical timing of the two eccentrics. The pawl eccentric starts downward only after the punches 32 have been retracted beneath the paper slot surface. The approximately 6.5 ms pulse to the solenoid 148 is timed to engage the pawl 156 with the ratchet 172 by the time the pawl 156 is on its downward stroke.

Figure 14:
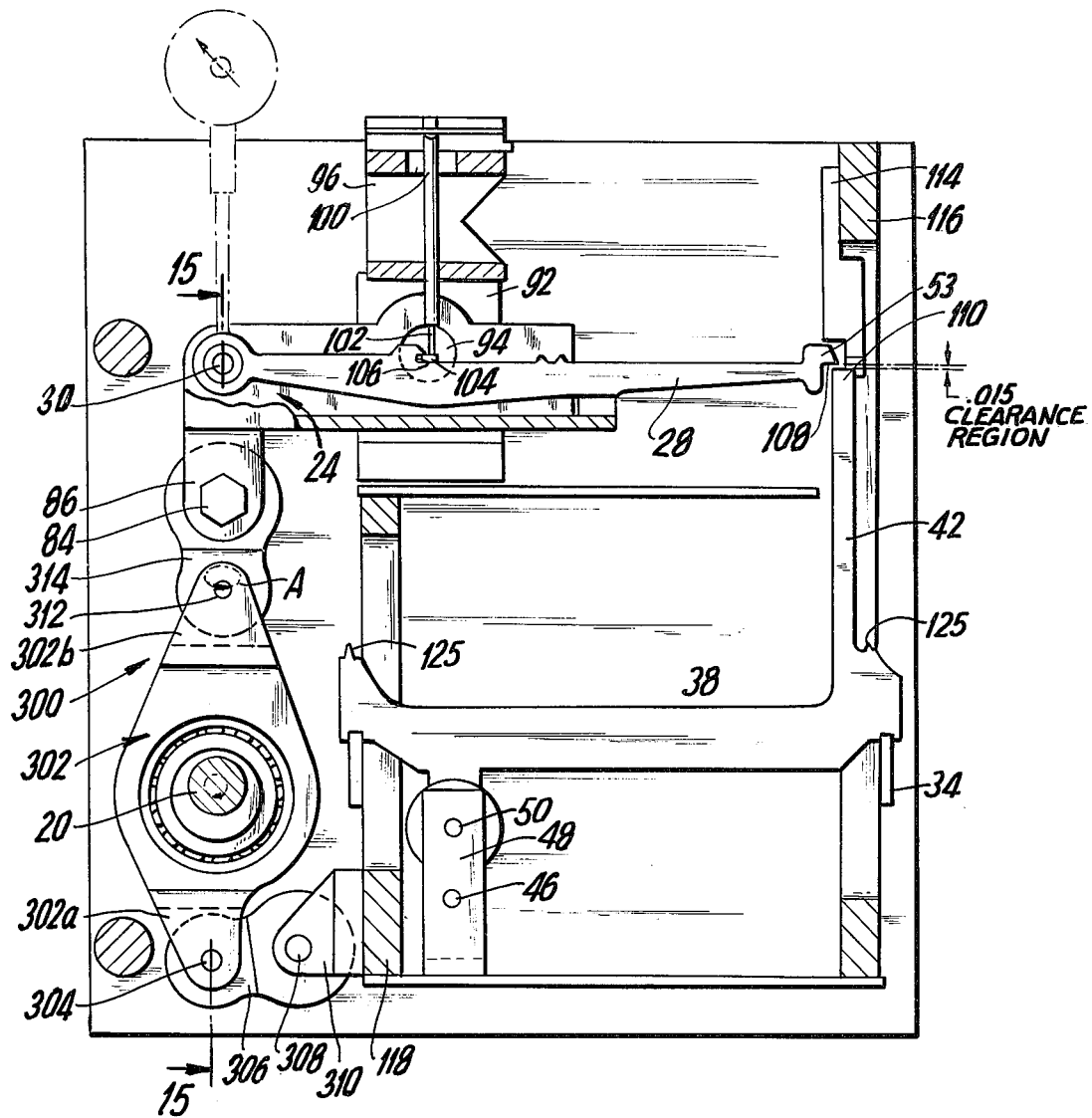
FIG. 14 is a sectional side elevation of an alternative form of the present invention with portions removed for purposes of clarity of illustration.
Figure 15:
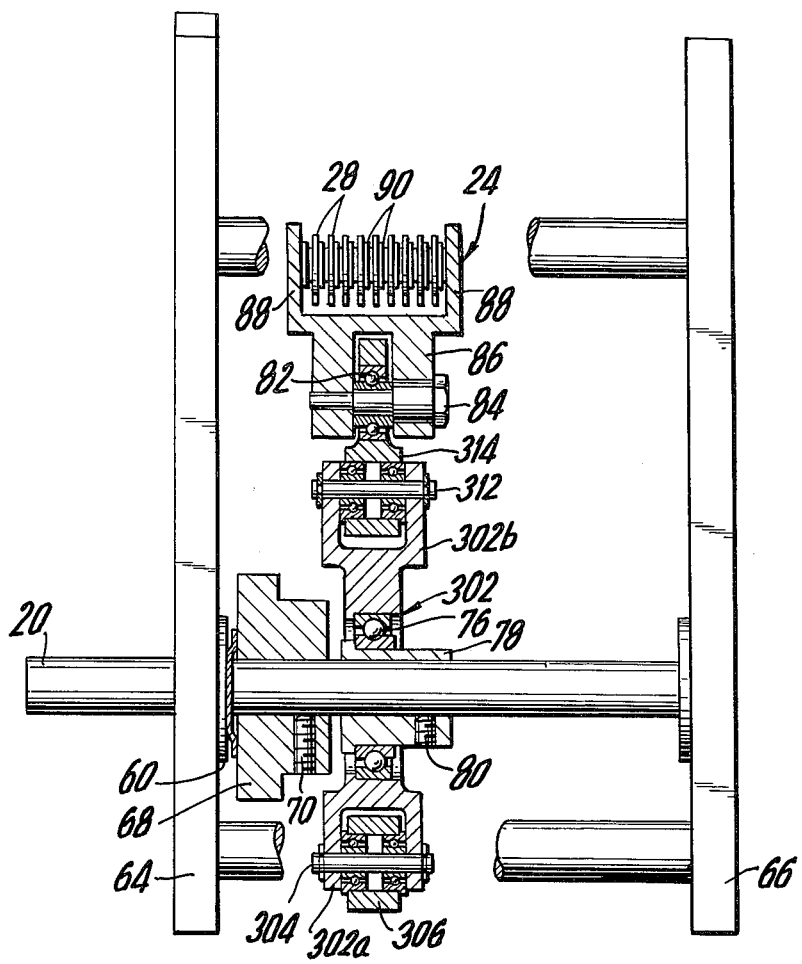
FIG. 15 is a vertical, sectional view taken along line 15—15 of FIG. 14.
Figure 16:
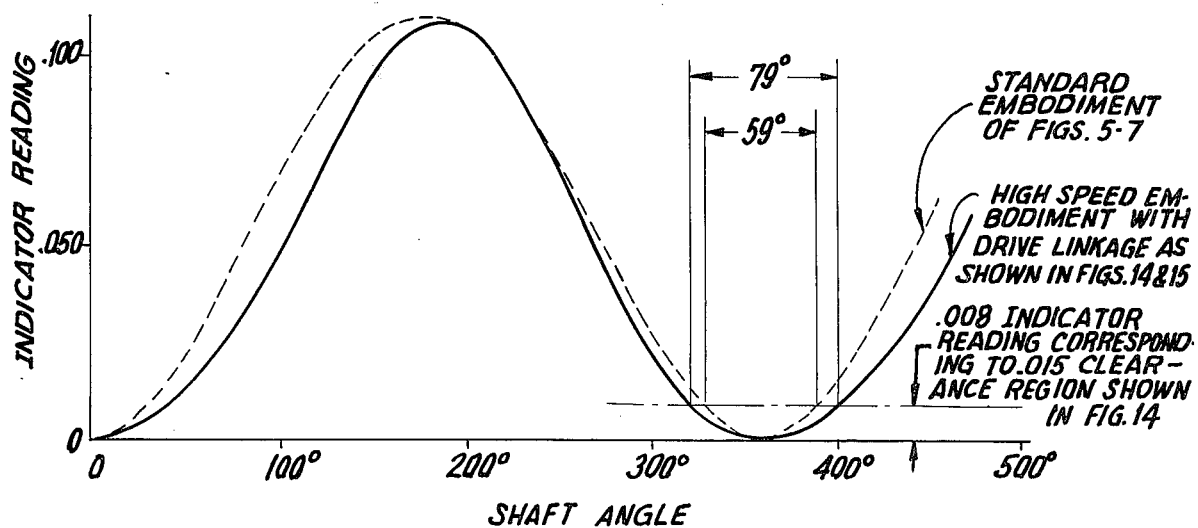
FIG. 16 is a graphical comparison of the mode of operation of the embodiments shown in FIGS. 5 and 14.

FIGS. 14–16 represent an alternative embodiment of the present invention. For purposes of clarity, the same reference characters will be used for common components. However, it should be noted that some common components have been eliminated from FIGS. 14 and 15 only for the purpose of simplifying the illustration.

Figure 5:
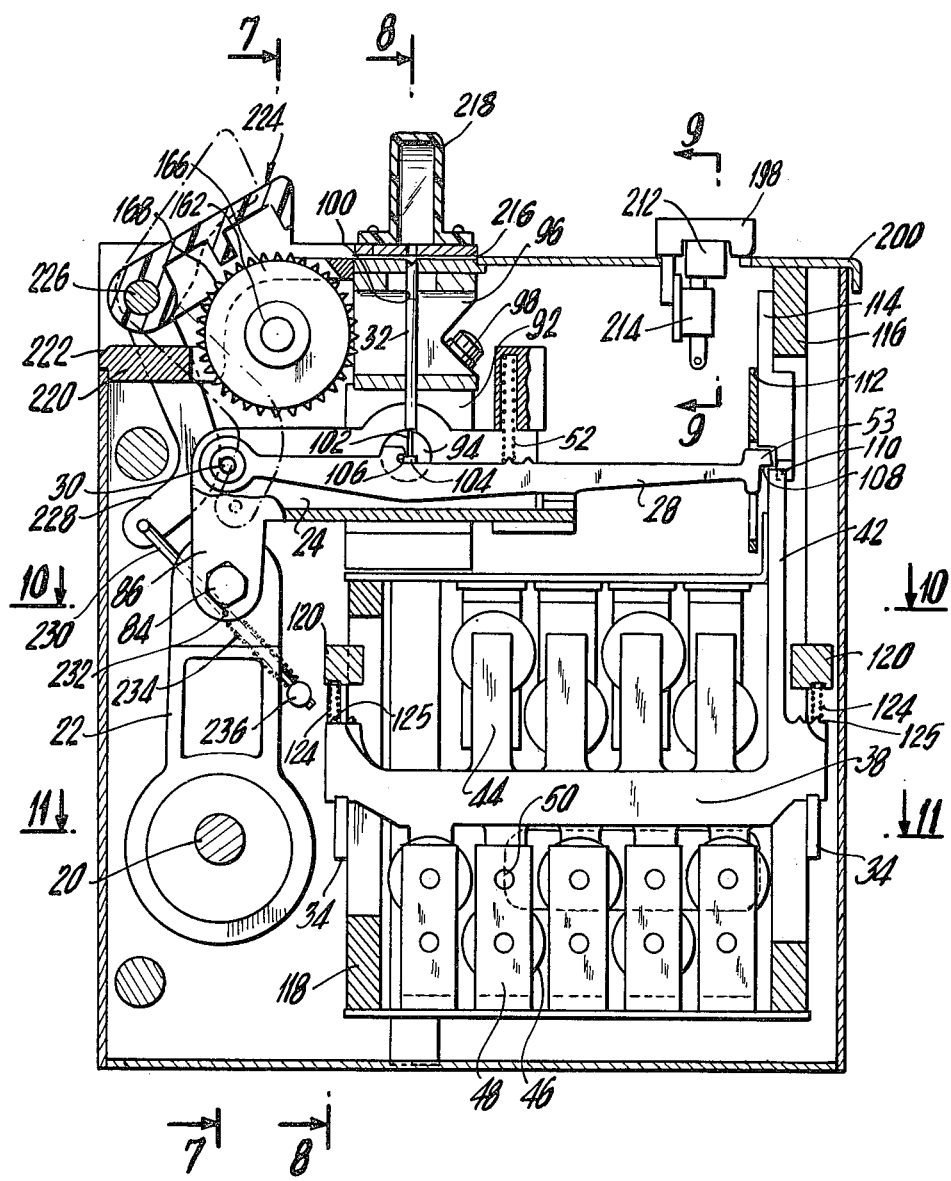
FIG. 5 is a sectional side elevational view of a preferred form of the present invention.
Figure 7:
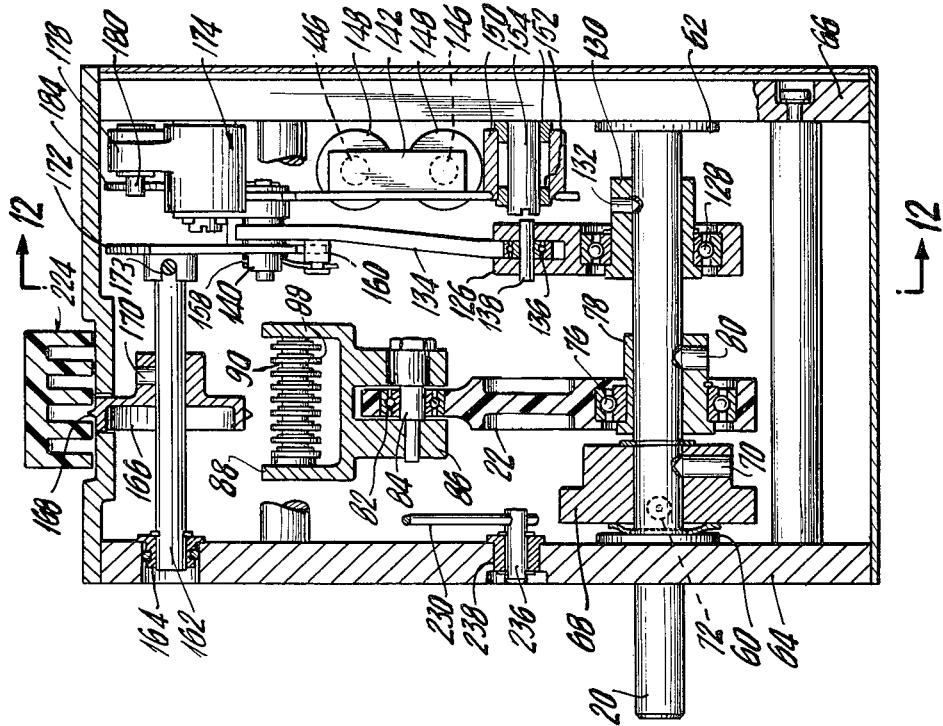
FIG. 7 is a vertical sectional view taken along line 7—7 of FIG. 5.
Figure 6:
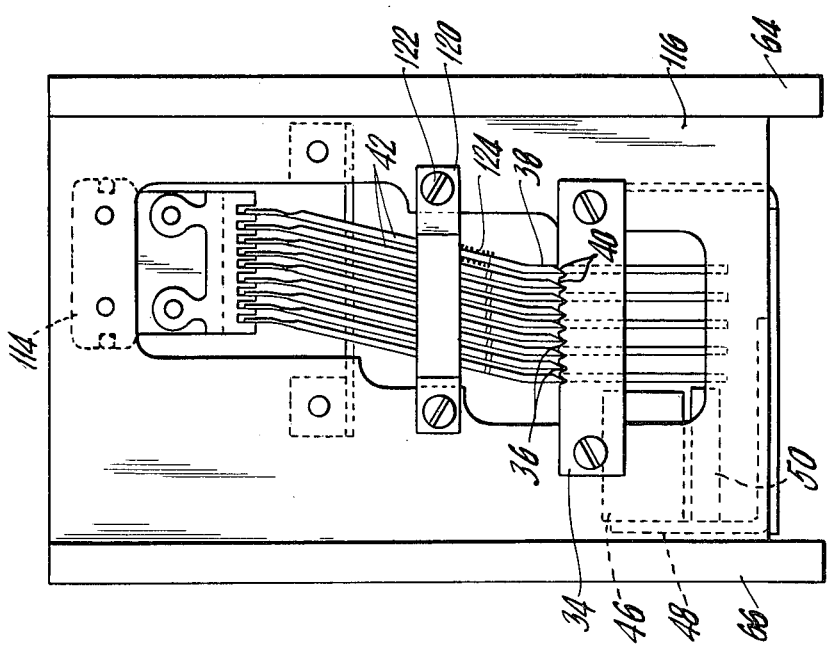
FIG. 6 is an end elevational view of the structure shown in FIG. 5.
Figure 9:
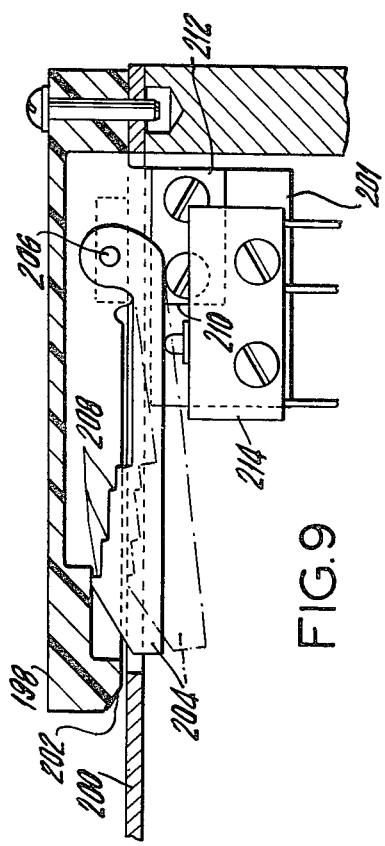
FIG. 9 is a fragmentary sectional elevational view taken along line 9—9 of FIG. 5.
Figure 10:
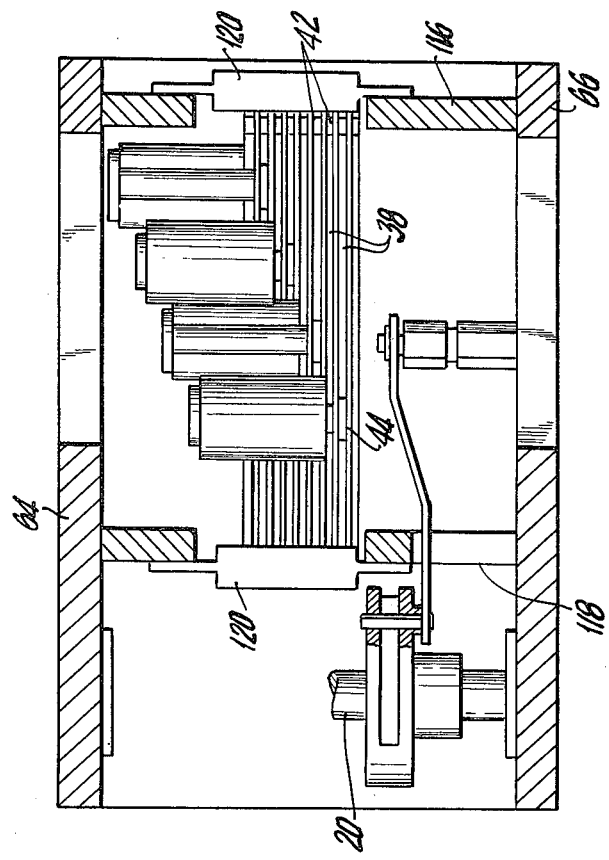
FIG. 10 is a sectional plan view taken along line 10—10 of FIG. 5.
Figure 8:
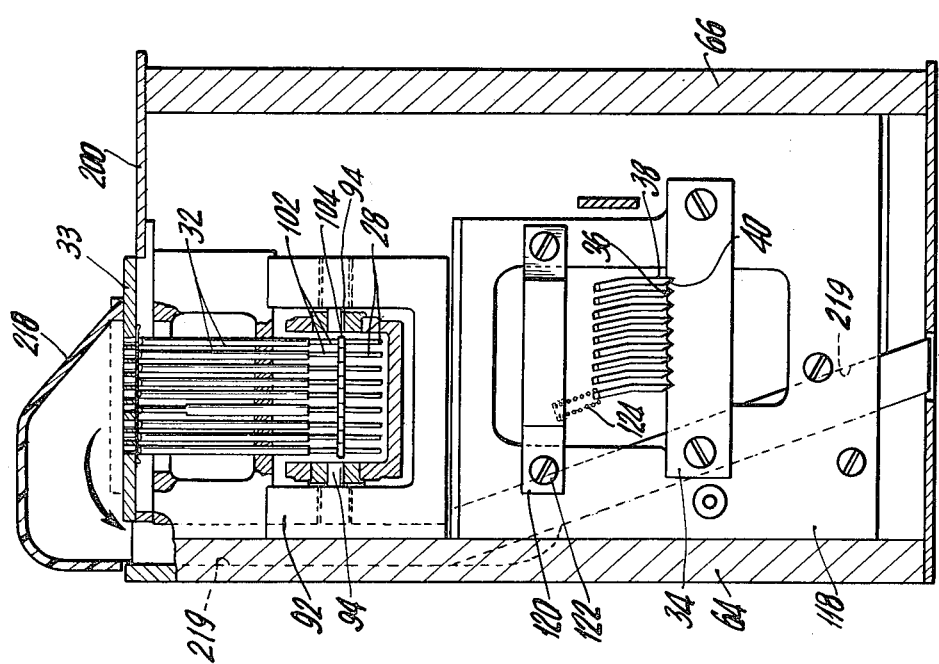
FIG. 8 is another vertical sectional view taken along line 8—8 of FIG. 5.
Figure 11:
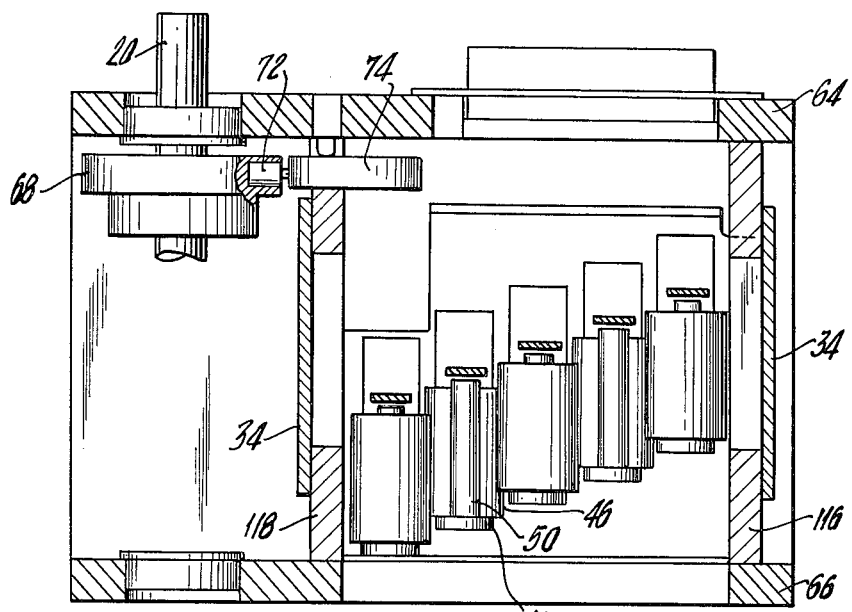
FIG. 11 is another sectional plan view taken along line 11—11 of FIG. 5.

The alternative design shown in FIGS. 14 and 15 provides a linkage system 300 that drives the cradle 24 and the lift lever 28 in a manner that will slow down the operation during the critical time of transfer that takes place during the short time intervals when the fulcrum levers 42 must either travel into place or withdraw themselves from underneath the end of the lift levers 28. The length of travel is designated as the "clearance region" in FIG. 14. The crank link 22 of the embodiment shown in FIGS. 5–7 is replaced by a double-ended member or bellcrank 302 that is mounted on the bearing 76 and the eccentric 78 (FIG. 7) in the same manner as shown for the link 22 in the FIGS. 5–7 embodiment. The lower end 302a of the bellcrank 302, however, is pivotally attached by a pin 304 to a lower link 306 and the lower link is, in turn, pivotally attached by a pin 308 to a fitting 310 that is secured to the face of the forward cross plate 118. The upper end 302b of the bellcrank 302 is pivotally attached by means of a pin 312 to an upper link 314 that is identical to the lower link 306. It should be noted that the hour-glass shape of the links 306 and 314 shown in FIG. 14 is for clearance purposes only of the lower link 306. For purposes of economy, it is desirable that the two links 306 and 314 are interchangeable. Conveniently, the links 306 and 314 may be made as plastic moldings so that the same hour-glass shape would be provided for both the upper link 314 and the lower link 306. The upper link 314 is also attached pivotally to the cradle 24 in the same manner as the link 22 is attached to the cradle 24 in the FIGS. 5–7 embodiment.

As the main drive shaft 20 of the apparatus is rotated, the pivot pin 312 and the upper end 302b of the bellcrank 302 travel along an elliptical path A that creates a partial dwell in the travel of the cradle 24, when it is near its low position at the front end. Therefore, a partial dwell occurs at the rear end of the lift levers 28 when at the critical transfer position. This is shown in FIG. 14 as the clearance region and is, in one form of construction, in the order of 0.015 inch.

The operation of the alternative embodiment just described may best be understood by reference to FIG. 16. Two sinusiodal displacement curves are shown which are measured with an indicator 316 that is shown in phantom outline in FIG. 14. The dashed line curve is obtained from the embodiment shown in FIGS. 5–7 while the solid outline curve is obtained from the embodiment shown in FIGS. 14 and 15. It will be appreciated that for the first upward movement and an indicator reading of 0.008 inch, which corresponds to the 0.015 inch clearance region, the FIG. 5 embodiment requires a shaft angle of 59° whereas the FIG. 14 embodiment with the modified linkage requires a shaft angle of 79°. This angular measurement is directly proportional to time. Thus, the FIGS. 14 and 15 embodiment travels 59/79 as fast as the FIGS. 5–7 embodiment throughout the critical transfer region assuming, of course, that both embodiments are driven at the same speed. This "slowing up" characteristic permits the use of the punch at higher speed with no sacrifice in performance. It should be particularly noted that the specific angular values of 59° and 79° are actual measured values that have been obtained from test models. However, these values can be altered by modification in the geometry of the linkage system. Accordingly, the foregoing shaft angles are used by way of illustration only and without any intent to be limiting as to the scope of the invention.

The tape perforator described hereinabove provides for a high degree of flexibility, reliability and quiet operation. Tape perforation speeds of up to 125 characters per second or more are available on 5, 6, 7 and 8 track tapes that may be made of paper, plastics such as mylar for example and aluminum-plastics-paper combinations from 0.0025 inches to 0.0045 inches thick by either 11/16 inch, ⅞ inch or 1 inch wide. The various tape widths may readily be accommodated without altering or changing the tape guide which also includes a tape break or tape end sensor.

Any desired character may be punched by applying a 28 volt d.c. pulse to a pulse selector bank for each hole in the character. A tape advance pulse then moves the tape into a position to receive the next character. Reference signals for the tape punch and tape advance signals are provided by means of a magnetic timing coil. The punches are mechanically actuated only when the tape is at rest and the tape is mechanically advanced only when the punches are completely withdrawn. Broad tolerance for timing and duration of the tape punch and advance pulses is provided by mechanical storage of early pulses. Thus, neither tape punching nor tape advance can take place, even in the presence of demand pulses, until the drive shaft has moved to the correct position.

Positive punching and punch retraction are provided by means of a crank arm and lever linkage arrangement, in combination with a positive motor drive. Thus, the mechanical wear and operating uncertainties that are inherent in clutch mechanisms and spring retraction systems are minimized. Two screws and precision ways are used to very simply replace the punch and die assembly in a minimum time when the punches become worn.

There has been disclosed heretofore the best embodiment of the invention presently contemplated. However, it is to be understood that various changes and modifications may be made thereto without departing from the spirit of the invention.

What we claim as new and desire to secure by Letters Patent are:

1. In a high speed tape perforator that includes:
   a. a cradle pivotally mounted on a fixed support for oscillating movement about a first transverse axis:
   b. drive means for oscillating the cradle about said first axis;
   c. a first plurality of elongated lift levers pivotally mounted proximate one end thereof in the cradle for selective oscillating movement about a second, transverse axis that is substantially parallel to and spaced from the first axis;
   d. an elongated punch mounted at one end on each of the first lift levers proximate the first axis, the longitudinal axis of each punch being substantially perpendicular to the first axis, the axes of the punches being in a plane that is approximately coincidental with the first axis;
   e. means for advancing the tape along a plane that traverses the plane of the longitudinal axes of the punches;
   f. a second plurality of elongated fulcrum levers equal in number to the first plurality of lift levers, the second plurality of levers being pivotable about axes that are substantially parallel to the planes of the first levers and movable between a first, non-punching mode position and a second, punching mode position whereby, in the first position of the second levers, the cradle and the first levers oscillate as a unit about the first axis and the punches are substantially devoid of movement in directions along the longitudinal axis thereof so that the punches do not perforate the tape and whereby, in the second position, the second levers interfere with the movement of the first levers so that the cradle continues to oscillate about the first axis but the first levers oscillate about the second axis to cause the punches to move longitudinally above the plane of and through the tape; and
   g. means for selectively moving the second levers from the first position to the second position, the improvement comprising:
      a. means for slowing down the movement of the first plurality of lift levers and the punches mounted thereon during the periods of time that the second plurality of fulcrum levers travel between the first and second positions thereof.

2. The tape perforator according to claim 1 wherein the drive means includes a drive shaft and said means for slowing the movement of the first plurality of lift levers and the punches mounted thereon comprises a bell crank mounted eccentrically on the drive shaft and means for coupling one end of said bell crank to the cradle.

3. The tape perforator according to claim 2 wherein said coupling means comprises a first link pivotally coupled to the cradle and to said one end of said bell crank.

4. The tape perforator according to claim 3 wherein said first link is made of a plastic material.

5. The tape perforator according to claim 3 wherein there is further included a second link for pivotally coupling the other end of said bell crank to a fixed portion of the tape perforator.

6. The tape perforator according to claim 5 wherein said first and second links are identical to each other.

7. The tape perforator according to claim 6 wherein said first and second links are made of a plastic material.

* * * * *